Patented Apr. 2, 1940

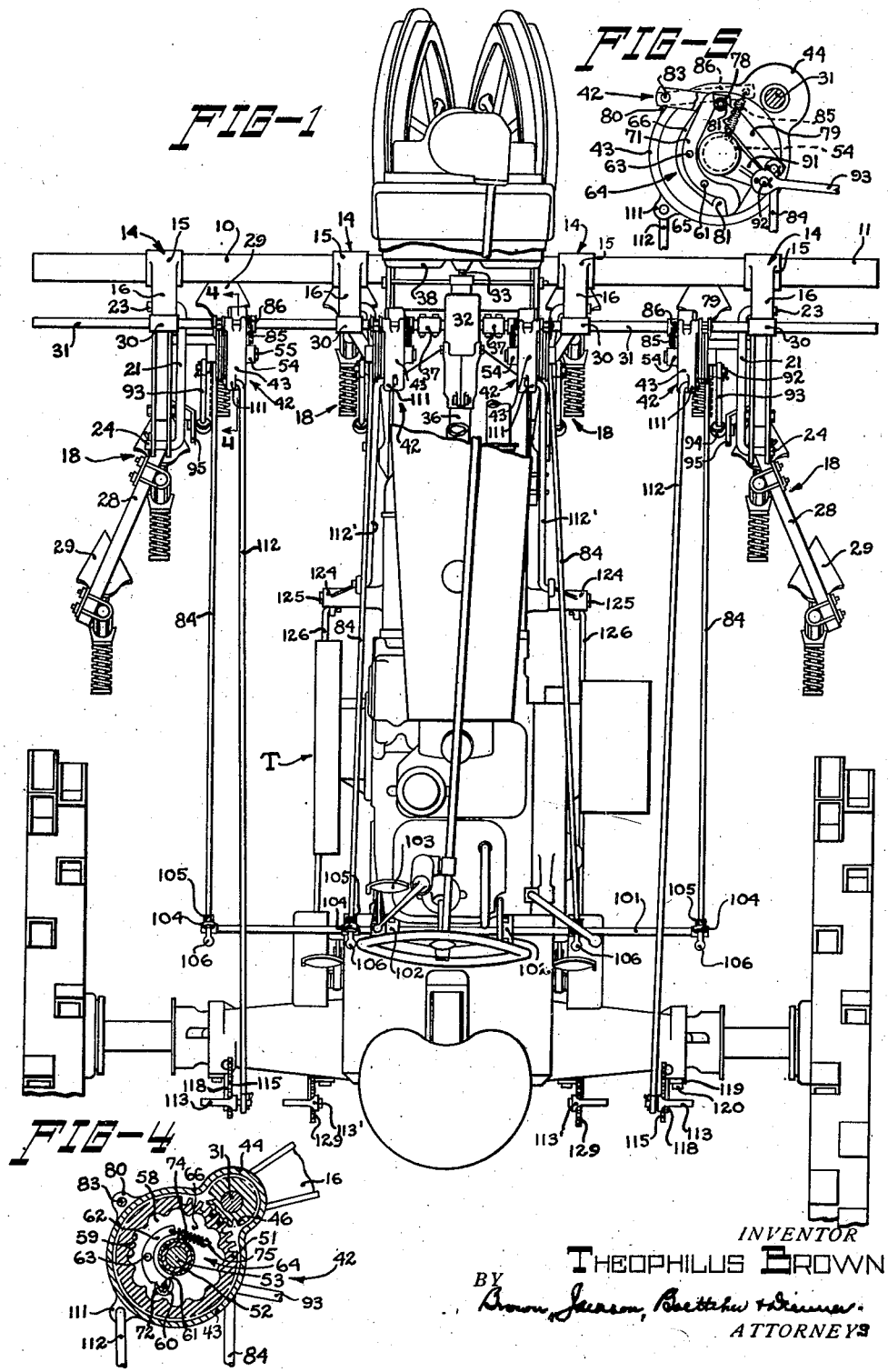

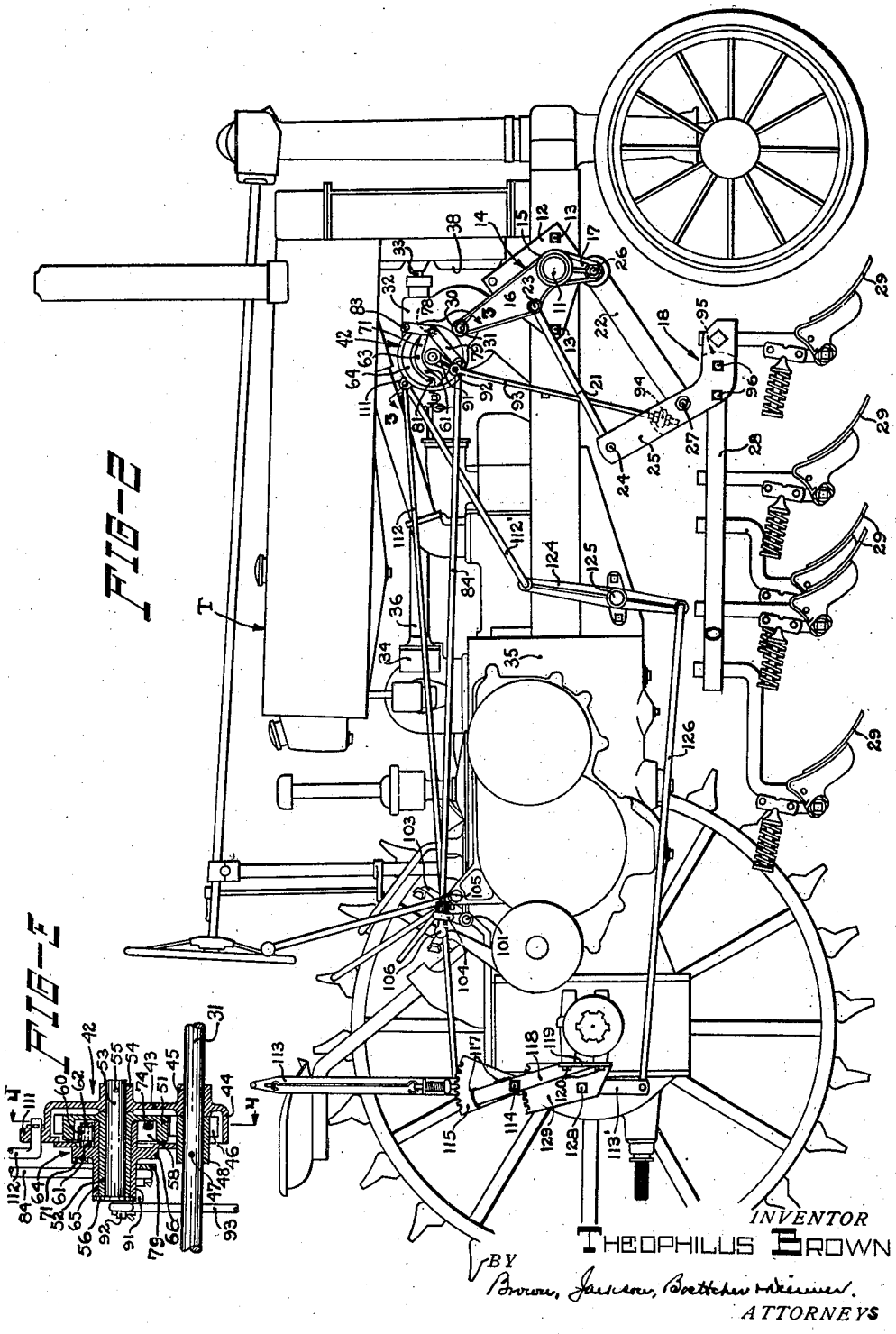

2,195,610

UNITED STATES PATENT OFFICE 2,195,610

POWER LIFT

Theophilus Brown, Moline, Ill., assignor to Deere & Company, Moline, Ill., a corporation of Illinois Application December 18, 1936, Serial No. 116,527

32 Claims. (Cl. 97—50)

The present invention relates to improvements in power lifts for tractors of the type adapted to derive power from the tractor motor and to utilize the same for operating the raising and lowering means of associated implements under the control of the operator on the tractor.

As is well known, soil erosion has become a serious problem for farmers in various sections of this and other countries, and in order to prevent excessive erosion of the soil in certain hilly farming districts it is customary to till the soil and plant in rows which follow the contour of the ground, rather than in rows extending in a direction perpendicular to an intersecting road or fence. In many instances, when working the soil and planting in contour following rows such rows terminate at an acute angle to the road or fence, and the rows thus formed are known as pointed rows. In cultivating these pointed rows with a cultivator which operates on several rows at the same time, which cultivators are now in very common use, it is evident that when the cultivator reaches the road or fence, the several rows upon which it is operating do not terminate on a line perpendicular to the line of advance of the tractor, and, therefore, when the tractor reaches the shortest row, the cultivator rig in that row should be raised independently of the other rigs, and such other rigs should be later raised in turn as the ends of their respective rows are reached. In some instances where this type of tilling and planting is followed the distance between the terminals of adjacent rows is as great as three hundred feet. Also, under such conditions, when starting to cultivate a number of pointed rows, the rigs should be lowered one at a time, as will be apparent.

In many cases also, hilly land is often terraced to further control the erosion of the soil. Such terraces ordinarily consist of ridges spaced thirty or forty feet apart, although in some cases, depending on the slope of the ground, they are even more widely spaced apart. These terraces or ridges also follow generally the contour of the ground, and the entire field, including the ridges, is tilled in contour following rows. Under such conditions it sometimes happens that, when cultivating a number of rows simultaneously along the top of a terrace, some of the cultivator rigs will run in rows on top of the ridge while others will run in rows on the side or near the bottom of the ridge, and this necessarily requires that the rigs be set at different depth adjustments relative to the tractor in order to properly cultivate the soil between all of the rows being operated upon.

Heretofore, under the above mentioned conditions, it has been necessary not only to adjust the depths of the rigs manually but also to lift and lower the rigs manually by means of individual levers for the several rigs. This, of course, is disadvantageous particularly when it is necessary also to use the same implement in situations where the rows in the field are not pointed but run perpendicular to a road or fence, as in such cases it is desirable that the rigs be raised and lowered simultaneously by power.

With the above in view, it is the principal object of the present invention to provide a tractor implement of this type with improved means for transmitting power to a series of individual power lift clutches whereby the cultivator rigs or other ground working tools may be separately raised and lowered, or whereby said individual power lift clutches may be simultaneously operated to raise and lower all of the rigs at the same time.

It is another object of the present invention to provide improved means for adjusting the depth of operation of the several cultivator rigs independently of each other, this being accomplished by swinging the clutch housings about their pivotal support on the drive shaft by which the several clutches are driven.

Other objects and advantageous features of the present invention will be apparent from the following description of the preferred embodiment of my invention taken in connection with the accompanying drawings, in which—

Figure 1 is a top plan view of a tractor cultivator equipped with my improved power lift and depth adjusting mechanisms;

Figure 2 is a side elevational view of the implement shown in Figure 1;

Figure 3 is an enlarged cross-sectional view through one of the power lift clutches, being taken substantially on the line 3—3 of Figure 2;

Figure 4 is a sectional view taken substantially on the line 4—4 of Figure 3 and illustrating the gear means for driving one of the clutches from the common driving shaft; and Figure 5 is an enlarged side elevational view of the clutch shown in Figures 3 and 4 and illustrating the clutch throwout mechanism.

Referring to the drawings, the tractor which is of a well known commercial type is indicated as an entirety by the reference letter T, and in the illustrated construction it has cultivator rigs supported thereon for cultivating two rows, although it is to be understood that the principles of the present invention can be applied to a tractor equipped with mechanism for cultivating any number of rows.

As best shown in Figure 1, the cultivator comprises the usual laterally extending tool supporting beams 10 and 11 disposed respectively at opposite sides of the tractor. The inner end of each of the supporting beams 10 and 11 is fixedly secured in any suitable manner to a plate 12 that is fixedly connected to the side of the tractor by bolts 13 as shown in Figure 2, or in any other suitable manner. Fixedly mounted on each of the laterally extending beams 10 and 11 is a pair of laterally spaced rig supporting brackets 14, each bracket comprising a hub portion 15 embracing the supporting beam, an upwardly and rearwardly extending arm or member 16, and a downwardly extending arm or member 17 (Figure 2), said arms being formed integral with said hub portion. Each bracket 14 carries a conventional cultivator rig indicated as an entirety by 18 and supported by means of a pair of upper and lower parallel links 21 and 22. As shown in Figure 2, the upper link 21 is pivotally connected at its forward end by a pivot pin 23 to the upper bracket arm 16, substantially midway of the length of said arm, and is pivotally connected at its rear end as shown at 24 to an upwardly extending frame member 25 of the associated cultivator rig 18. The lower link 22 is pivotally connected at its forward or upper end to the lower end of the downwardly extending bracket arm 17 by a bolt 26, and at its rear or lower end it is pivotally connected as shown at 27 to the rig frame member 25.

The rig frame 18 also includes a supporting member or bar 28 that is secured in any suitable manner to the frame member 25 and extends rearwardly therefrom. The supporting member 28 carries a plurality of earth working shovels 29. As the supporting frame member 28 is disposed at an acute angle to the line of advance, as shown in Figure 1, the shovels 29 are offset from each other so that each works in its own track, and each of the rigs is adapted to cultivate one half of the space between two adjacent rows of crops in the conventional manner. By means of the parallel link connection between each of the rig supporting brackets 14 and its associated cultivator frame member 25, each rig is maintained parallel to the frame of the tractor T in all positions of vertical adjustment which will be hereinafter described, and as there are no connections between the several individual cultivator rigs, each rig 18 is free to swing vertically about its points of pivotal attachment 23 and 26 to its respective supporting bracket 14.

A hub 30 is formed at the upper end of the arm 16 of each of the rig supporting brackets 14. These several hubs 30 are disposed in transverse alinement and carry a rotatable power shaft 31 that extends parallel to the main rig supporting beams 10 and 11 as shown in Figure 1. The power shaft 31 is driven by a worm gear mechanism indicated as an entirety by the numeral 32 (Figures 1 and 2) which in turn is driven from the fan shaft 33 of the tractor. The worm gear mechanism 32 comprises a worm on the fan shaft 33 that meshes with a worm gear on the transverse shaft 31, said worm and worm gear being enclosed within a suitable housing. This fan shaft 33 extends forwardly from a gear box 34 on the transmission housing 35 of the tractor, and is enclosed in a tubular housing member 36, as best shown in Figure 2. This fan shaft construction is of conventional design and is well known in the art, and, therefore, further description thereof is deemed unnecessary herein. It will be understood from the above that the power shaft 31 is continuously driven from the fan shaft of the tractor whenever the tractor motor is running.

In order to provide for detachment of the power shaft 31 when the cultivator attachment is removed and the tractor is to be used for other purposes, said shaft is made in two sections, the inner end of each of the sections being coupled to the adjacent outer end of the worm gear shaft by means of a coupling 37 (Figure 1), said couplings being readily detachable. In the present construction the worm gear is made a permanent element of the tractor mechanism and merely idles when the power shaft 31 is disconnected and the tractor is used for other purposes. The fan of the tractor is indicated by 38 and is secured to the forward end of the fan shaft 33 as usual.

Each of the cultivator rigs 18 is provided with an individual power lift mechanism of the well known self-interrupting half revolution clutch type and indicated as an entirety by the reference numeral 42. As the several power lift mechanisms illustrated in the accompanying drawings are identical in construction a description of one of them will suffice. As shown in Figures 3, 4 and 5, each of the power lift mechanisms includes a main supporting housing 43 having a projecting housing portion 44 formed integral therewith. The projecting housing portion 44 has a hub 45 formed therein (Figure 3) which embraces the power shaft 31. The shaft 31 is journaled in the hubs 45 of the housing projections 44 of the several clutch mechanisms 42, and said shaft therefore serves as a pivotal support for the several housings, the purpose of which will hereinafter appear.

Disposed within each housing projection 44 is a pinion 46 which is rigidly secured to the shaft 31 by a pin 47 that extends through alined openings in the hub 48 of the pinion 46 and in the shaft 31 (Figure 3). Meshing with the pinion 46 is a gear 51 that is provided with an integral elongated hub 52 journaled on an axle 53 within the main housing 43. This axle 53 has a cantilever support in a hub 54 formed in one side of the main housing 43 and is secured rigidly to said hub by a pin 55. Fixed to the other end of the axle 53 is a retaining member 56 which holds the hub 52 of the gear 51 from axial movement on the axle 53.

It will be seen from the above that the gear 51 is continuously rotated by the power shaft 31 through the pinion 46. This gear 51 forms the continuously rotating driving element of the clutch mechanism, and is provided within a recess 58 formed therein with pawl engageable notches 59. These notches 59 are adapted to be engaged by a clutch roller 60 journaled on one end of a pin 61 carried at the lower end of a pawl arm 62 (Figure 4) which in turn is pivoted substantially midway of its length on a pin 63 on the intermittently rotated or driven element 64 of the clutch 42. The driven element 64 of the clutch comprises a hub 65 (Figure 3) which is journaled on the hub 52 of the gear 51, and a radial flange 66 to which the pivot pin 63 of the pawl arm 62 above described is attached.

The clutch 42 is provided with the usual clutch throwout dog 71 which is pivoted on the pawl pivot 63 on the opposite side of the flange 66 of the intermittently driven clutch element 64 from the pawl arm 62. The pin 61 on which the clutch roller 60 is journaled and which has one end connected to the pawl arm 62, extends through a slot 72 in the flange 66 (Figure 4) and has its other end connected to the throwout dog 71 (Figure 5). A spring 74 is connected at one end to the upper end of the pawl arm 62, as shown in Figure 4, and has its other end attached to a lug 75 on the flange 66, this spring exerting a yielding force tending to engage the clutch roller 60 at the opposite end of the pawl arm 62 with the notches 59 in the continuously rotating driving element 51 of the clutch mechanism as hereinafter described. Normally, however, the roller 60 is held out of engagement with the notches 59 by the throwout dog 71 which is held in position by a roller 78 (Figure 5) journalled on a pin on a tripping lever 79. The roller 78 engages in one of two notches 81 that are spaced 180° apart (Figure 2) in the flange 66 of the intermittently driven clutch element 64. When the roller 78 is in this position it also engages the throwout dog 71 which in turn acts through the pin 61 to hold the clutch roller 60 journaled on said pin out of engagement with the notches 59.

The tripping lever 79 has one end fixedly connected to a pin 83 journaled on a lug 80 on the clutch housing 43, while its opposite end is connected to a tripping rod 84. The roller 78 is yieldingly held in the notch 81 by a spring 85 having one end fixedly connected to an arm 86 fixed to the opposite end of the pin 83 from the tripping lever 79 and having its opposite end fastened in any suitable manner to the hub 54 of the clutch housing 43.

Each of the cultivator rigs is connected with its associated clutch by means which will now be described. This means comprises a crank arm 91 formed integral with the hub 65 of the intermittently driven clutch element (Figures 2 and 5). The crank arm 91 is provided with a crank pin 92 at its outer or free end, to which crank pin is pivotally connected the upper end of a lifting rod 93 having its lower end connected to the cultivator rig 18 by means of an eye-bolt 94 which is bolted to a bracket 95 fixed to the rig frame member 25 by bolts 96 (Figures 1 and 2).

From the foregoing description of the several parts it will be apparent that each of the cultivator rigs 18 is raised and lowered by means of its associated clutch mechanism 42. The cultivator rig 18 illustrated in Figure 2 is shown in its lowered or operating position and when it is desired to lift said rig to inoperative position this is readily accomplished by pushing the tripping rod 84 forwardly. This swings the tripping lever 79 upon its pivot 83 against the action of the spring 85 and moves the roller 78 out of the notch 81 and also out of engagement with the throwout dog 71. It will be remembered that the throwout dog 71 is connected with the pawl 62 through the pin 61 which extends through the slot 72 in the radial flange 66 of the driven clutch element 64, and, therefore, simultaneously with the disengagement of the throwout dog 71 from the roller 78 the spring 74 which is connected to the pawl 62 will exert a pull on the pawl to swing said pawl on its pivot 63 to thereby move the clutch roller 60 on the pin 61 into engagement with one of the notches 59 on the continuously rotating gear driving element 51 of the clutch. When the roller 60 is so connected, the driven element 64 of the clutch will be rotated by the driving element 51 one-half of a revolution in a clockwise direction, as viewed in Figure 2, during which time the roller 78 will ride on the cam periphery of the driven clutch element 64 until the roller 78 reaches the opposite notch 81. The tripping lever 79 will then swing on its pivot 83 under the action of the spring 85 and the throwout dog 71 will be moved back to its initial position by the movement of the roller 78 into the notch 81, and the throwout dog will in turn move the pawl to disconnect the clutch roller 60 from the notch 59 in the driving clutch element 61 in which it has been engaged, thereby disconnecting the two clutch elements.

In the illustrated construction four cultivator rigs have been shown, and each of said rigs is raised and lowered by a half revolution clutch mechanism having a separate tripping rod 84. The four tripping rods 84 extend rearwardly to a transversely extending tripping rock shaft 101 that is rotatably supported in brackets 102 secured in any suitable manner on the tractor body. This tripping rock shaft is operated by a foot pedal 103. Each of the tripping rods 84 is slidably supported in an aperture in the upper end of an arm 104 which is fixedly connected at its lower end to the transverse shaft 101 (see Figure 2). A collar 105 is fixed to each of the tripping rods 84 by means of a set screw, and are so positioned on their respective rods as to engage with the arms 104 when the several parts are in their normal inoperative position. The collars 105 are secured to the tripping rods 84 by the set screws so that said collars may be properly positioned on the rods in proper relation to the arms 104 so that said rods will be operated by the foot pedal 103. By pushing forward on the foot pedal, the shaft 101 will be rocked in a clockwise direction, as viewed in Figure 2, carrying with it the arms 104, and as such arms are normally in engagement with the collars 105 as above described all of the rods will be moved forwardly by the arms to trip the several clutch mechanisms simultaneously. Thus the rigs can be simultaneously raised and lowered alternately by successive manipulations of the pedal 103. At the rear end of each of the tripping rods 84 a handle portion 106 is provided, and when it is desired to trip an individual clutch mechanism the operator may accomplish this by merely grasping the handle portion 106 of the tripping rod 84 associated with that clutch mechanism and pushing forwardly on the same, the rod sliding through the aperture in the arm 104 in this operation. The handle portion 106 is spaced a sufficient distance rearwardly of the arm 104 on the tripping rock shaft to allow for this forward movement of the rod 84.

It will be readily apparent therefore that by providing the foregoing construction, when the tractor reaches the end of a pointed row the clutch controlling the cultivator rig in that row can be tripped by the operator to raise that rig, and in like manner the other clutches can be tripped in turn as the ends of their respective rows are reached. It is, of course, understood that a second actuation of each of the tripping rods 84 will cause their respective clutches to lower the rigs when so desired. It will also be apparent that when the implement is being used in a field where the rows run perpendicular to a road or fence and no pointed rows are encountered, the operator may raise and lower all of the rigs simultaneously by using the foot pedal 103.

In the present construction new and improved means has been provided for adjusting the depth of operation of the cultivator rigs, and this is accomplished by swinging the clutch housings 43 about the axis of the power shaft 31. For this purpose each of the clutch housings 43 is provided with a separate level adjusting rod connected at its forward end to a lug 111 on the housing and extending rearwardly to a hand lever disposed convenient to the operator's position on the tractor. As shown in Figure 1, each of the two outer clutch housings 43 is provided with a level adjusting rod 112 which extends rearwardly and is directly connected to an adjusting lever 113. Each lever 113 is pivoted, as at 114, to a sector 115 that is fixed to the tractor in any suitable manner, such as by being welded, as at 117, to a bracket 118, the lower end 119 of which is bent outwardly and fastened in position by bolts 120 to the outer end of the tractor axle housing. The two inner clutch housings 43 which are nearest the tractor are each connected by a level adjusting rod 112' (Figure 2) to the upper end of a vertically extending arm 124 journaled intermediate its ends on a trunnion 125 attached to the adjacent side of the tractor frame. The lower end of each of the pivoted arms 124 is connected by a rod 126 to an inner adjusting lever indicated by the numeral 113'. This linkage arrangement between the two inner levers 113' and the two inner clutch housings 43 is provided in order to avoid interference between the adjusting rods and parts of the tractor. Each of the inner adjusting levers 113' is pivoted as at 128 to a sector 129 that is secured to the tractor in substantially the same way as the sectors 115. Both pairs of adjusting levers 113 and 113' carry conventional latch mechanism cooperating with the associated sectors for holding the levers in any adjusted position. It is to be understood, however, that my invention is not limited to the specific means for connecting the clutch housings to their adjusting levers, as any other means suitable for accomplishing the desired purpose may be equally satisfactory.

It will be seen from the foregoing that when the cultivator is being used along the side of a ridge or terrace and it is necessary that the cultivator rigs be adjusted to run at different depths, the operator may readily and quickly adjust the several rigs to the proper operating depth by the use of the several hand levers 113 and 113'. This depth adjustment of the several cultivator rigs accomplished by swinging the clutch housings about the axis of the power shaft 31, of course, does not interfere with the operation of the clutch mechanisms within the housings for raising and lowering the rigs, as the positions of the various parts within the housing are always maintained in the same relation to each other, as will be readily appreciated.

While I have shown and described my invention as applied to a tractor cultivator, it is to be understood, of course, that the invention may be used in connection with other tractor implements or in any other situation where it may be applicable.

I claim:

1. A tractor propelled agricultural machine comprising, in combination, a plurality of shiftable units, a separate power lift mechanism for shifting each of said units, a constantly rotating power shaft for transmitting power to all of said power lift mechanisms at the same rate, separate means for manually controlling each of said power lift mechanisms, and mechanical means having a one way connection with said separate means for simultaneously operating the latter for actuating said power lift mechanisms in unison, said one way connection providing for individual actuation of said power lift mechanism by the selected separate means.

2. A tractor cultivator comprising, in combination, a plurality of cultivator rigs disposed at each side of the cultivator, a separate power lift mechanism for raising and lowering each of said rigs, a constantly rotating power shaft for transmitting power to all of said power lift mechanisms, gear means connecting said shaft with each power lift mechanism, separate manually actuated means for controlling each of said power lift mechanisms, and mechanical means interconnected with said separate control means for simultaneously operating the latter to actuate said power lift mechanisms in unison.

3. The combination with a tractor having a constantly rotating fan shaft and a plurality of cultivator rigs, of a separate power lift mechanism for raising and lowering each of said rigs, a constantly rotating power shaft for transmitting power to said power lift mechanisms and driven from said fan shaft, separate means for actuating each of said power lift mechanisms, and means for simultaneously operating said separate means for actuating said power lift mechanisms in unison.

4. An agricultural machine comprising, in combination, a shiftable unit, a power lift clutch mechanism connected with said unit for shifting the latter, a drive shaft supported eccentrically of said clutch mechanism, means connecting said shaft with said clutch mechanism for driving the latter, and means for swinging said clutch mechanism about said drive shaft as an axis for adjusting the position of said unit.

5. A tractor cultivator comprising, in combination, a cultivator rig, a power lift clutch mechanism connected with said rig for raising and lowering said rig, a power shaft for said power lift mechanism, a housing enclosing said power lift mechanism and journaled on said power shaft, the driving member of said clutch being supported by said housing, and means for swinging said housing about the axis of said shaft for raising and lowering said rig to adjust the depth thereof.

6. A tractor cultivator comprising, in combination, a plurality of cultivator rigs, a separate power lift mechanism for raising and lowering each of said rigs, a power shaft, means for driving each power lift mechanism from said power shaft, means for actuating all of said mechanisms in unison comprising a tripping rod connected with each of said mechanisms, a tripping rock shaft, means for actuating said tripping rods in unison from said tripping rock shaft, and means for separately actuating each of said tripping rods.

7. A tractor cultivator comprising, in combination, a plurality of cultivator rigs, a separate power lift clutch mechanism for raising and lowering each of said rigs, a constantly rotating power shaft for transmitting power to all of said mechanisms, said mechanisms being journaled on said power shaft, separate means including a transversely disposed rock shaft for actuating each of said mechanisms, and means for simultaneously operating all of said separate means for actuating said clutch mechanisms in unison.

8. A tractor cultivator comprising, in combination, a plurality of cultivator rigs, a separate power lift clutch mechanism for raising and lowering each of said rigs, a constantly rotating power shaft for transmitting power to all of said clutch mechanisms, said clutch mechanisms being journaled on said power shaft, separate manually operated means for initiating the operation of each of said mechanisms, mechanical means interconnected with said separate control means for simultaneously operating the latter to actuate said clutch mechanisms in unison, said mechanical means having lost motion connection with said separate means to provide for separate operation of said power lift mechanisms by said separate means, and separate depth adjusting means for each of said rigs.

9. A tractor cultivator comprising, in combination, a plurality of cultivator rigs disposed at each side of the cultivator, a separate power lift mechanism for raising and lowering each of said rigs, a constantly rotating power shaft for transmitting power to all of said mechanisms, separate means extending to a point adjacent the operator's station on the tractor for manually controlling each of said mechanisms, means extending to opposite sides of the cultivator and interconnected with said separate means for simultaneously operating the latter to actuate said mechanisms in unison, and separate depth adjusting means for each of said rigs comprising a housing enclosing each of said clutch mechanisms and journaled on said power shaft, means connecting each of said housings with its associated rig, and separate means for swinging each of said housings about said power shaft as an axis.

10. A tractor cultivator comprising, in combination, a longitudinally extending frame, a beam extending laterally from each side of said frame, a plurality of cultivator rigs carried by each of said beams laterally outwardly of said longitudinally extending frame, a power shaft rotatably supported by said beams, a power lift mechanism for each of said rigs supported on said power shaft laterally outwardly of said longitudinally extending frame and operatively connected with the rigs for raising and lowering the latter, means for driving said lift mechanisms from said power shaft, manually operated means extending to a point adjacent the operators' station on the tractor and operatively connected laterally outwardly of said longitudinally extending frame to separately control each of said lift mechanisms, mechanical means interconnected with said separate means for simultaneously operating the latter to actuate said lift mechanisms in unison, and means for separately adjusting the operating depth of each of said rigs.

11. A tractor cultivator comprising, in combination, a longitudinally extending frame, a beam extending laterally from each side of said frame, a plurality of cultivator rigs carried by each of said beam, a power shaft supported by said beams, a power lift mechanism for each of said rigs comprising a housing journaled on said power shaft and means within said housings for driving said power lift mechanisms from said power shaft, means operatively connecting said power lift mechanisms with said rigs, manually operated means extending to a point adjacent the operator's station on the tractor for separately controlling each of said power lift mechanisms, mechanical means interconnected with said separate means for simultaneously operating the latter to actuate said power lift mechanisms in unison, and separate means for swinging each of said housings on said shaft for adjusting the operating depth of said rigs.

12. A tractor cultivator comprising, in combination, a transversely extending supporting beam, a bracket carried by said beam, a cultivator rig supported by said bracket for generally vertical movement, a power shaft journaled in the upper end of said bracket and adapted to be driven from the tractor motor, a power lift unit comprising a casing swingable about the axis of said power shaft and supported at least in part on said bracket, and clutch mechanism within said casing operatively driven from said power shaft, means connecting said power lift mechanism with said rig for raising and lowering the latter, and means connected with said power lift casing and adapted to swing the latter about the axis of said power shaft for also raising and lowering said rig.

13. A self-interrupting clutch mechanism comprising a casing, a constantly rotatable part in said casing, means for driving said part, an intermittently operated part journaled for rotation in said casing and adapted to be driven from said constantly rotatable part, means connected with said casing and adapted to disconnect said intermittently operated part from said constantly rotatable part and to hold the intermittently operated part in position relative to said casing, and means for shifting said casing about the axis of said driving means to adjust the released position of said intermittently operated part.

14. The combination with a tractor having a relatively high speed fan shaft, of a self-interrupting clutch mechanism having a constantly rotatable part, and gear reduction means for driving said part from said fan shaft.

15. The combination with a tractor having a rear axle housing and a pair of cultivator rigs supported at each side of the tractor for adjustment relative thereto, of a separate adjusting mechanism for each rig, a pair of controlling levers at each side of the tractor fixed to the axle housing with the ends of the inner levers extending below said housing, links extending above the axle housing from the outer levers to the outer adjusting mechanisms, a lever pivoted to the intermediate portion of the tractor at each side, links extending from the lower ends of said inner controlling levers to the lower ends of said pivoted levers, and links extending from the upper ends of the pivoted levers to the inner adjusting mechanisms.

16. A tractor propelled implement comprising, in combination, a plurality of movable units, a power lift mechanism for each of said movable units, links extending from the rear of each of said power lift mechanisms, a controlling rock shaft having an arm for slidably receiving each of the links, a collar on each of said links, said collars being engageable by said arms when the rock shaft is rocked in one direction, and a handle portion on each of said links for separately operating the latter independently of the rock shaft.

17. The combination with a tractor having a constantly rotating fan shaft and a plurality of cultivator rigs, power lift means for raising and lowering said rigs, a constantly rotating power shaft for transmitting power to said power lift means, and means for driving said power shaft from said fan shaft.

18. A tractor cultivator comprising, in combination, a plurality of cultivator rigs, a separate power lift mechanism for raising and lowering each of said rigs, a power shaft, means for driving each power lift mechanism from said power shaft, means for actuating all of said mechanisms in unison comprising a part connected with each of said mechanisms, and means having a one-way connection with each of said parts for operating the latter in unison, said one-way connections providing for actuation of each of the power lift mechanisms independently of the others.

19. An agricultural implement comprising, in combination, a supporting member, a bracket carried thereby, an operating unit supported by said bracket, a power shaft journalled in the upper portion of said bracket, a power lift unit comprising a casing swingable about the axis of said power shaft and clutch mechanism within said casing operatively driven from said power shaft, means connecting said power lift mechanism with said operating unit for raising and lowering the latter, and means connected with said power lift casing for swinging the latter about the axis of said power shaft for also raising and lowering said operating unit.

20. A tractor propelled implement comprising, in combination, a plurality of movable units, a power lift mechanism for each of said movable units, links connected with each of said power lift mechanisms, a controlling rock shaft having an arm for slidably receiving each of the links, stop means on each of said links, said stop means being engageable by said arms when the rock shaft is rocked in one direction, and means for separately operating the latter independently of the rock shaft.

21. In combination with a tractor having an engine driven shaft, a transverse tool supporting beam carried by the tractor, a ground working tool swingably mounted on said beam for movement between operative and transport positions, power lift clutch mechanism supported by said tool supporting beam and operatively connected to move said tool, a drive shaft rotatably supported by said tool supporting beam and removable therewith, said shaft being connected to drive said mechanism, and means for coupling said drive shaft to said engine driven shaft when said tool supporting beam is mounted on said tractor.

22. In combination with a tractor having an engine driven shaft, an implement comprising a supporting structure adapted to be detachably mounted on and carried by said tractor, a plurality of ground working tools swingably mounted on said structure for independent movement thereon between operative and transport positions, individual power lift clutch mechanisms associated with each of said tools, respectively, and mounted on said structure, a common drive shaft for said clutch mechanisms, said drive shaft being journaled on said structure and removable from the tractor therewith, and means for coupling said drive shaft to said engine driven shaft when said implement structure is mounted on said tractor.

23. In combination with a tractor having an engine, an implement comprising a supporting structure including a horizontally disposed beam extending laterally from and supported by said tractor, a plurality of laterally spaced ground working tools swingably mounted on said beam for independent movement between operative and transport positions, an individual power lift clutch mechanism for each of said tools and operatively connected to the latter to move the same between said positions, a transversely disposed drive shaft supported on said beam and operatively connected to drive said clutch mechanisms, and means for connecting said drive shaft to said tractor engine for receiving power therefrom.

24. In combination with a tractor having an engine, a cultivator comprising a pair of tool beams carried by said tractor and extending laterally from opposite sides thereof, a plurality of laterally spaced cultivator rigs swingably mounted on each of said beams for independent vertical movement relative thereto, an individual power lift clutch connected to each of said rigs for independently controlling the movement thereof and supported by said beams, a transversely disposed drive shaft journaled on each of said beams and connected to drive the clutches on the respective beams, and means for driving each of said drive shafts from said tractor engine.

25. In combination with a tractor having an engine, a cultivator comprising a pair of tool beams carried by said tractor and extending laterally from opposite sides thereof, a plurality of laterally spaced cultivator rigs swingably mounted on each of said beams for independent vertical movement between upper and lower positions, a transversely disposed drive shaft journaled on each of said beams and connected to the tractor engine to receive power therefrom, an individual power lift clutch for each of said rigs and connected thereto for moving the latter between said positions, journal means for supporting each of said clutches on one of said drive shafts, and means for swinging said clutches about said journal means for adjusting the depth of operation of said rigs.

26. A tractor cultivator comprising in combination, a plurality of sets of cultivator devices, a separate power lift mechanism for raising and lowering each set of said devices, a power shaft, an individually operable tripping element connected with each of said mechanisms and movable in one direction for separately actuating its associated mechanism and shifting the associated cultivator device independently of the others, and a movably mounted tripping member having a one way connection with each of said tripping elements for moving all of them in said one direction and shifting all of said cultivator devices in unison.

27. The combination with a tractor having a fan adjacent the forward end thereof and a shaft connected with said fan for driving the latter, of a beam extending laterally from each side of the tractor adjacent the front end thereof, transversely disposed power shaft means supported by said beams and disposed adjacent said fan shaft, means for driving said power shaft means from said fan shaft, tool means connected with each of said laterally extending beams, and a self-interrupting clutch mechanism for each of said tool means, each clutch mechanism having a constantly rotatable part, and means for operatively connecting each part to said power shaft means to be driven thereby.

28. The combination with a tractor having a fan disposed adjacent the forward end thereof and a shaft connected with said fan for driving the latter, of a pair of tool supporting beams, one extending laterally outwardly from each side of the tractor, vertically movable tool means connected with the beam at each side of the tractor, power lift mechanism at each side of the tractor and operatively connected with the tool means at that side of the tractor, constantly rotating power means for transmitting power to all of said mechanisms, and means for driving said power means from said fan shaft.

29. The combination with a tractor having a fan and a fan shaft connected therewith and disposed adjacent the forward end of the tractor, of a pair of tool beams, one connected to each side of the tractor and extending laterally outwardly therefrom at the forward end thereof adjacent the fan shaft, two supporting bracket means carried by each beam, tool means connected with said bracket means for vertical movement relative thereto, transversely disposed power shaft means supported by said brackets and extending across the tractor adjacent said fan shaft, means for driving said power shaft from said fan shaft, and power lift means at each side of the tractor driving power from said power shaft and operatively connected to raise the tool means at either side of a tractor independently of the power lift means and tool means at the other side of the tractor.

30. The combination set forth in claim 29, further characterized by a link extending rearwardly at each side of the tractor from each of said power lift means, said link controlling the associated power lift means, and a transverse rock shaft carried adjacent the rear of the tractor and having a one way connection with each of said links whereby the power lift means at both sides of the tractor may be operated simultaneously to raise or lower all of said tool means in unison.

31. The combination set forth in claim 29, further characterized by the tractor having a rear axle housing, and means supported on the latter for adjusting said power lift means to vary the depth of operation of said tool means.

32. The combination set forth in claim 29, further chracterized by said tractor having a rear axle housing, and said transverse shaft being supported by the tractor forward of said rear axle housing.

THEOPHILUS BROWN.

CERTIFICATE OF CORRECTION.

Patent No. 2,195,610.   April 2, 1940.

THEOPHILUS BROWN.

It is hereby certified that error appears in the printed specification of the above numbered patent requiring correction as follows: Page 4, second column, lines 68 and 69, claim 7, strike out the words "including a transversely disposed rock shaft" and insert the same after "means" in line 70, same claim; page 5, first column, line 48, claim 10, for "operators'" read --operator's--; and that the said Letters Patent should be read with this correction therein that the same may conform to the record of the case in the Patent Office.

Signed and sealed this 11th day of June, A. D. 1940.

(Seal)

Henry Van Arsdale,
Acting Commissioner of Patents.